(12) United States Patent
Xun et al.

(10) Patent No.: US 9,385,884 B2
(45) Date of Patent: Jul. 5, 2016

(54) NODE JOINING PROTOCOL FOR CLUSTER FEDERATION

(71) Applicant: Microsoft Technology Licensing, LLC, Redmond, WA (US)

(72) Inventors: Lu Xun, Redmond, WA (US); Rishi Rakesh Sinha, Bothell, WA (US); Mansoor Mohsin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 652 days.

(21) Appl. No.: 13/631,564

(22) Filed: Sep. 28, 2012

(65) Prior Publication Data

US 2014/0092773 A1    Apr. 3, 2014

(51) Int. Cl.
     *H04L 12/28*      (2006.01)
     *H04L 12/42*      (2006.01)
     *H04L 12/751*      (2013.01)

(52) U.S. Cl.
     CPC ............... *H04L 12/42* (2013.01); *H04L 45/02* (2013.01)

(58) Field of Classification Search
     CPC ............................... H04L 12/42; H04L 45/02
     USPC .......................................... 370/254–255, 258
     See application file for complete search history.

(56) References Cited

U.S. PATENT DOCUMENTS

| 5,734,909 | A | * | 3/1998 | Bennett .................... 710/200 |
| 6,467,050 | B1 | | 10/2002 | Keung |
| 7,694,167 | B2 | | 4/2010 | Kakivaya et al. |
| 7,796,539 | B2 | | 9/2010 | Denecheau et al. |
| 8,151,062 | B2 | | 4/2012 | Krishnaprasad et al. |
| 2002/0194392 | A1 | * | 12/2002 | Cheng et al. ................. 709/318 |
| 2009/0113034 | A1 | * | 4/2009 | Krishnappa et al. .......... 709/223 |
| 2009/0319684 | A1 | | 12/2009 | Kakivaya et al. |
| 2010/0106831 | A1 | * | 4/2010 | Kakivaya et al. ............. 709/225 |

OTHER PUBLICATIONS

Cavale, Mohan Rao, "Introducing Microsoft Cluster Service (MSCS) in the Windows Server 2003 Family", Published on: Nov. 2002, Available at: http://msdn.microsoft.com/en-us/library/ms952401.aspx.

"MS Cluster Server Concepts", Published on: Sep. 16, 2008, Available at: http://technet.microsoft.com/en-us/library/cc723240.aspx.

* cited by examiner

*Primary Examiner* — Peter Cheng

(74) *Attorney, Agent, or Firm* — Ben Tabor; Harri Valio; Micky Minhas

(57) ABSTRACT

Obtaining tight knowledge about nodes in a federated ring structure. The tight knowledge includes information about neighbors of a given node. The method includes at a given node, sending a join request, requesting to join a federated ring in a distributed computing environment. The method further includes, at the given node, receiving a join reply. The join reply provides an initial view of at least a portion of a neighborhood of the given node. The neighborhood is a set of nodes logically proximate the given node. The method further includes, at the given node, sending a lock request to nodes in the neighborhood to request that the other nodes in the given node's neighborhood are locked so as to not have overlapping nodes joining the given node's neighborhood simultaneously.

18 Claims, 4 Drawing Sheets

NODE JOINING PROTOCOL FOR CLUSTER FEDERATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnecting computer systems may be performed to create a distributed federation ring structure. A distributed federation ring structure is a set of computer nodes where the computer nodes are arranged in a logical ring structure. For example, assume that the ring structure has 4 nodes 1, 2, 3, and 4. Node 1 is logically next to nodes 2 and 4 in the ring structure. Node 2 is logically next to nodes 1 and 3 in the ring structure. Node 3 is logically next to nodes 2 and 4 in the ring structure. And node 4 is logically next to nodes 3 and 1 in the ring structure. Nodes in the federation ring structure have knowledge about nodes in their neighborhood. Such knowledge may include a node ID, a transport address, node interface information, etc. A node neighborhood may be a given number of nodes in any direction. Thus, given a node ring structure with nodes 1, 2, 3, 4, 5, 6, 7, 8, 9 and 10 arranged as described above, a node neighborhood value of 2 would cause node 5 to have in its neighborhood nodes 3, 4, 6, and 7 (two nodes on either side of node 5).

When multiple nodes join a distributed federation ring structure at the same time, maintaining consistent neighborhood knowledge, and at the same time allowing the nodes to join without unnecessary delay is a challenge, especially when the same ring joining algorithm supports rings of very different size (e.g. from below 10 nodes up to tens of thousands of nodes). Previous algorithms employed throttle and back-off strategies which produced more random behaviors.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment including a plurality of nodes in a federated ring. The method includes acts for obtaining tight knowledge about nodes in the computing environment. The tight knowledge includes information about neighbors of a given node. The method includes at a given node, sending a join request, requesting to join a federated ring in a distributed computing environment. The method further includes, at the given node, receiving a join reply. The join reply provides an initial view of at least a portion of a neighborhood of the given node. The neighborhood is a set of nodes logically proximate the given node. The method further includes, at the given node, sending a lock request to nodes in the neighborhood to request that the other nodes in the given node's neighborhood are locked so as to not have overlapping nodes joining the given node's neighborhood simultaneously.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments implement a new algorithm for joining nodes to a federation ring structure. Federated rings are described in detail in U.S. patent application Ser. No. 11/936,589 filed on Nov. 7, 2007 titled "Maintaining Consistency Within A Federation Infrastructure" and U.S. patent application Ser. No. 12/038,363 filed on Feb. 27, 2008 titled "Neighborhood Maintenance In The Federation" both of which are incorporated herein by reference in their entireties. Some embodiments described herein may be more deterministic than previous throttle and back-off strategies. Embodiments described herein are based on locks. The following discussion illustrates use of a join protocol using lock and unlock protocol elements.

A join protocol is used after a bootstrap protocol completes and goes through several phases which guarantee ring consistency during the join process. In particular, for a node to join a ring structure, nodes in a neighborhood of the joining node need to collect information about the joining node. Further, the joining node needs to obtain information about nodes in the neighborhood of the joining node.

Figure 1:
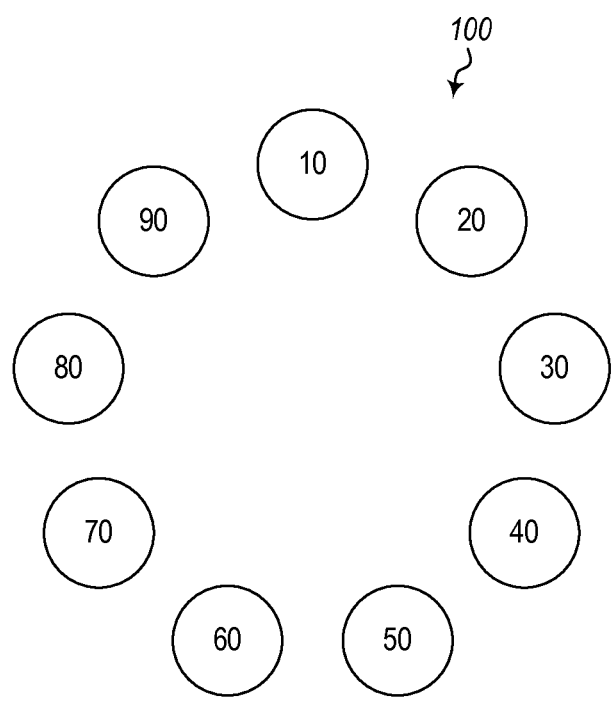
FIG. 1 illustrates a federated ring.

The protocol uses two phase commit to serialize admission of nodes within a given ring neighborhood, where the ring neighborhood, in the present example, is defined as the set of k consecutive nodes in the ring. In other words, for any given ring neighborhood, only one node is admitted to that neighborhood at any given instant of time. The insertion ensures that all the nodes in a neighborhood have been notified of the inserting node and they have updated their internal state accordingly. FIG. 1 illustrates an example node ring structure 100 including nine nodes 10, 20, 30, 40, 50, 60, 70, 80, and 90. The nodes shown as being adjacent to each other are logically adjacent to each other in the ring structure 100. The nodes of the ring structure 100 have node IDs assigned in a linear fashion such that it is simple to route messages in the ring structure to a given node. For example, if node 10 wishes to send a message to node 50, node 10 knows to send the message to node 20, which knows to send the message to node 30, which knows to send the message to node 40, which knows to send the message to node 50 all based on the node IDs of the nodes in the ring structure 100. The preceding example is applicable when node 20 is the node closest to node 50 known to node 10. If for example node 50 is already in node 10's neighborhood, node 10 will send message to 50 directly.

Figure 2:
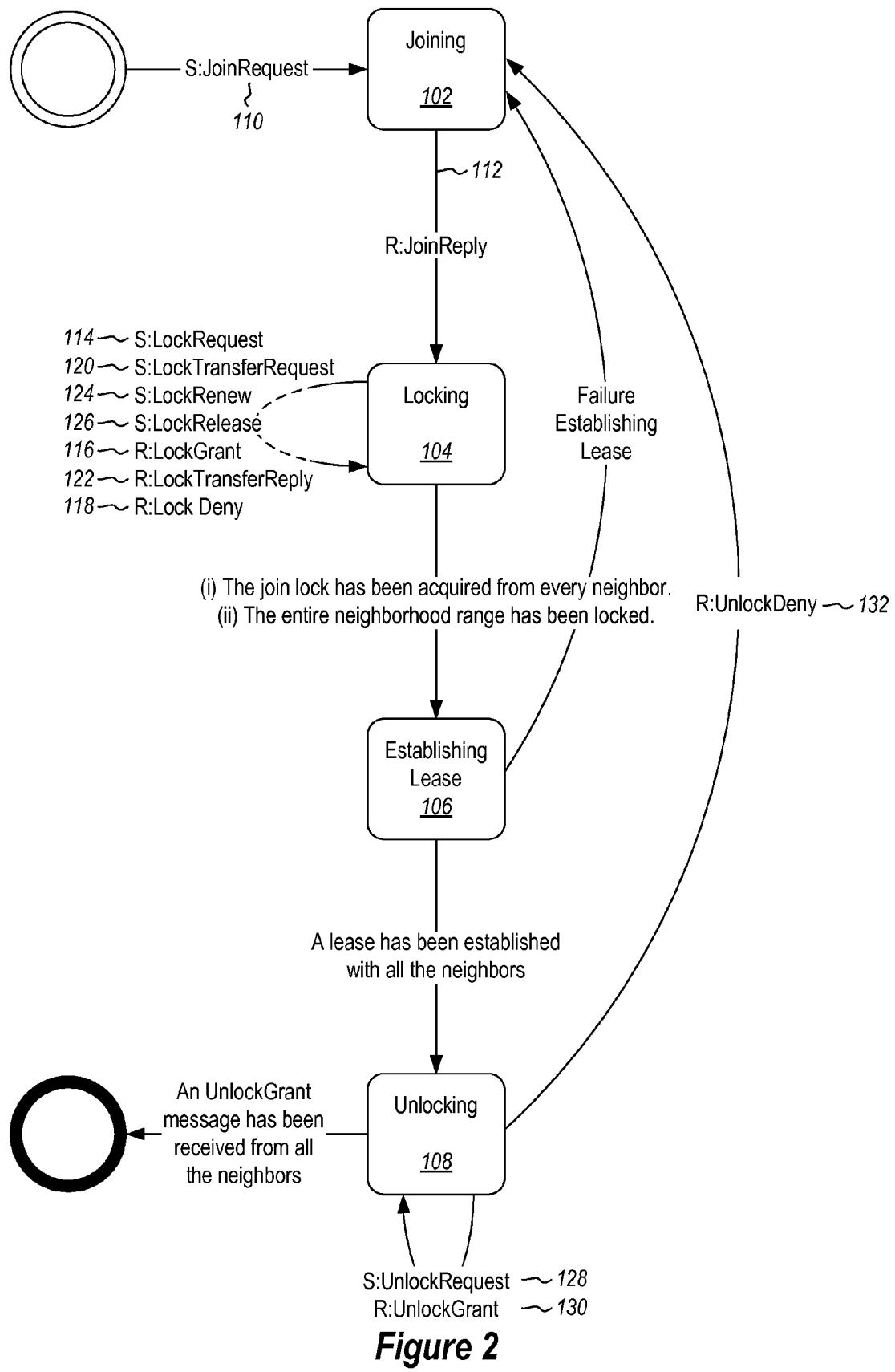
FIG. 2 illustrates a state machine representation of a join protocol.

In the illustrated example, as illustrated in FIG. 2, the protocol goes through four phases: a Join phase 102, a Lock phase (104), an Establish Lease phase (106) and an Unlock phase (108). For illustrative purposes, as shown generally in FIG. 2 and with more specificity in FIG. 3, the following messages are involved in the Join Protocol: JoinRequest 110; JoinReply 112; LockRequest 114; LockGrant 116; LockDeny 118; LockTransferRequest 120; LockTransferReply 122; LockRenew 124; LockRelease 126; UnlockRequest 128; UnlockGrant 130; and UnlockDeny 132. While these messages are shown, other messages with similar functionality may be used in the alternative.

All these messages, when sent, contain the neighborhood of the sending node. The following is a description of these phases and the overall protocol state machine.

The following illustrates the Join Phase 102. In the Join Phase 102, the joining node J routes a JoinRequest 110 message targeted to its own ID. In other words, the joining node sends a message addressed to itself. Because of the way ring structure messages are routed, this message may be sent by joining node J to any node that the joining node J is aware of, such as an appropriate entrée node, but the message is ultimately received by an existing node R that is the closest node to node J. As illustrated above, routing in the ring structure will result in the message being sent to existing node R.

Node R sends back a JoinReply 112 message containing R's full neighborhood. When node J receives the JoinReply message, it gets its initial view of the neighborhood from that message. At this point node J knows its position in the ring if it were to join the ring.

The following illustrates the Lock Phase 104. In the Lock Phase 104, the joining node J sends a LockRequest 114 message to each of the nodes in its neighborhood. In particular, node J needs to obtain a lock from every node in its neighborhood before it can effectively join the ring structure. This prevents other nodes from joining the ring structure having nodes from the neighborhood that node J will belong to at the same time as node J is attempting to join the ring structure. Every such LockRequest is added to a list of PendingRequests. Node R is now illustrated as a representative example of all of the nodes that receive a LockRequest. Thus, each node in node J's neighborhood that receives a lock request will perform the actions illustrated for node R. Once node R receives a LockReqest 114 message, it does the following:

If a lock illustrated herein as JoinLock(R) is "available" (in that is has not currently been given to another node trying to join the ring structure), it marks the JoinLock (R) as "granted" and sends a LockGrant 116 message to the requesting node J. The LockGrant 116 message contains JoinLockID(R) and NR(R), the neighborhood of node R with respect to node R. Node R also sets up a timer for a duration $T_L$. If the timer expires, the JoinLock (R) is marked as "available" again allowing other nodes to take the JoinLock(R).

If the JoinLock(R) has already been "granted" to another node N, it sends a LockDeny 118 message to the requesting node J. The LockDeny 118 message contains the identity of node N and JoinLockID (R).

In addition to the list of PendingRequests, the node J also maintains a list of AcquiredLocks. In some embodiments, once node J receives a reply from a node R, it does the following:

If the reply is a LockDeny 118 message, node J sends a LockTransferRequest 120 message to node N to attempt to have the node N. transfer the JoinLock(R) to the node J. In particular, the node J needs locks to be granted from all of the nodes in the neighborhood for node J to join the ring structure.

If the reply is a LockGrant 116 message, node J processes the acquired lock.

Once a joining node N receives a LockTransferRequest 120 message from joining node J, it matches the requesting JoinLockId(R) with the one that it has already acquired. Node N can then evaluate certain criteria to determine if it should transfer the lock or not. For example, logic may be implemented to cause locks to be transferred only if the requesting node has a smaller (or alternatively greater) node ID. Alternatively, logic may be implemented to cause locks to be transferred only if the requesting node (e.g. node J) has more locks than the requested node (e.g. node N) If the join lock IDs match and the node is in the Locking Phase, it sends a LockTransferReply 122 message if the transfer logic criteria is met. The LockTransferReply 122 message contains JoinLockID (R), NR(R), and the identity of node R. When node J receives the LockTransferReply 122 message from node N, it sends a LockRenew 124 message to node R. The LockRenew 124 message contains JoinLockID (R) and updates node R that the join lock has been transferred from node N to node J. Node J then processes the acquired lock.

Processing of an acquired lock involves the following steps:
1. Examine N (J), the neighborhood of node J. If the neighborhood has changed, node J sends a LockRequest 114 message each new node in the neighborhood.
2. Add node R to the list of AcquiredLocks.
3. If there is any node Z in AcquiredLocks such that node Z is outside of the updated NR(J)), node J removes node Z from the list of AcquiredLocks and send a LockRelease 126 message node Z. The LockRelease 126 message contains JoinLockID(Z).
4. Node J removes node Z from the list of PendingRequests.
5. If the following condition is true, node J completes the Lock Phase and moves on to the Establish Lease Phase:
   i. For every node X in N(J), JoinLock(X) has been acquired.

Once an existing node R receives a LockRelease message, it marks JoinLock(R) as "available" and cancels the corresponding timer.

The following illustrates the Establish Lease Phase 106. In this phase, the joining node establishes a monitoring relationship with each of its neighbors. This is done by establishing a lease with each of its neighbors through a LeaseAgent. A LeaseAgent uses a lease layer. The basic usage of the lease layer is for an application running on one machine to detect when an application running on another machine has stopped functioning due to the entire machine being down, a communication problem between machines, or the machine being up, but an application on the machine not functioning. Once a joining node successfully establishes a lease with all of its neighbors, it moves onto the Unlock Phase; otherwise, it restarts and moves back to the Join Phase.

The following illustrates the Unlock Phase 108. The Unlock Phase 108 is also known as the Insert Phase. In this phase, a joining node gets inserted into the neighborhood of its neighbors. The joining node J sends an UnlockRequest 128 message to each of the nodes in its neighborhood. Once an existing node R receives a UnlockRequest 128 message from node J, it checks if JoinLock(R) is indeed granted to node J, or if the lock is "available". If yes, it performs the following steps:

1. Marks JoinLock(R) as "available".
2. Cancels the timer associated with JoinLock(R).
3. Sends an UnlockGrant 130 message back to node J.
4. Inserts node J to its neighborhood.

On the other hand, if JoinLock(R) has expired, node R sends an UnlockDeny 132 message to node J. Once node J has received an UnlockGrant 130 message from all its neighbors, it completes the Join Protocol and moves onto the Routing Phase. However, if it receives an UnlockDeny 132 message, then it increments its node instance ID and goes back to the Joining Phase 102.

The following illustrates a state machine representation of the Join Protocol. For the sake of simplicity, failures are omitted from the state machine. However, in general, if there is a communication failure embodiments retry the communication. Other severe failures take the state machine to the Join Phase 102. If a message is received in an unexpected fashion, it essentially results in a no-op because all the reply messages involved in the protocol are idempotent.

Figure 3:
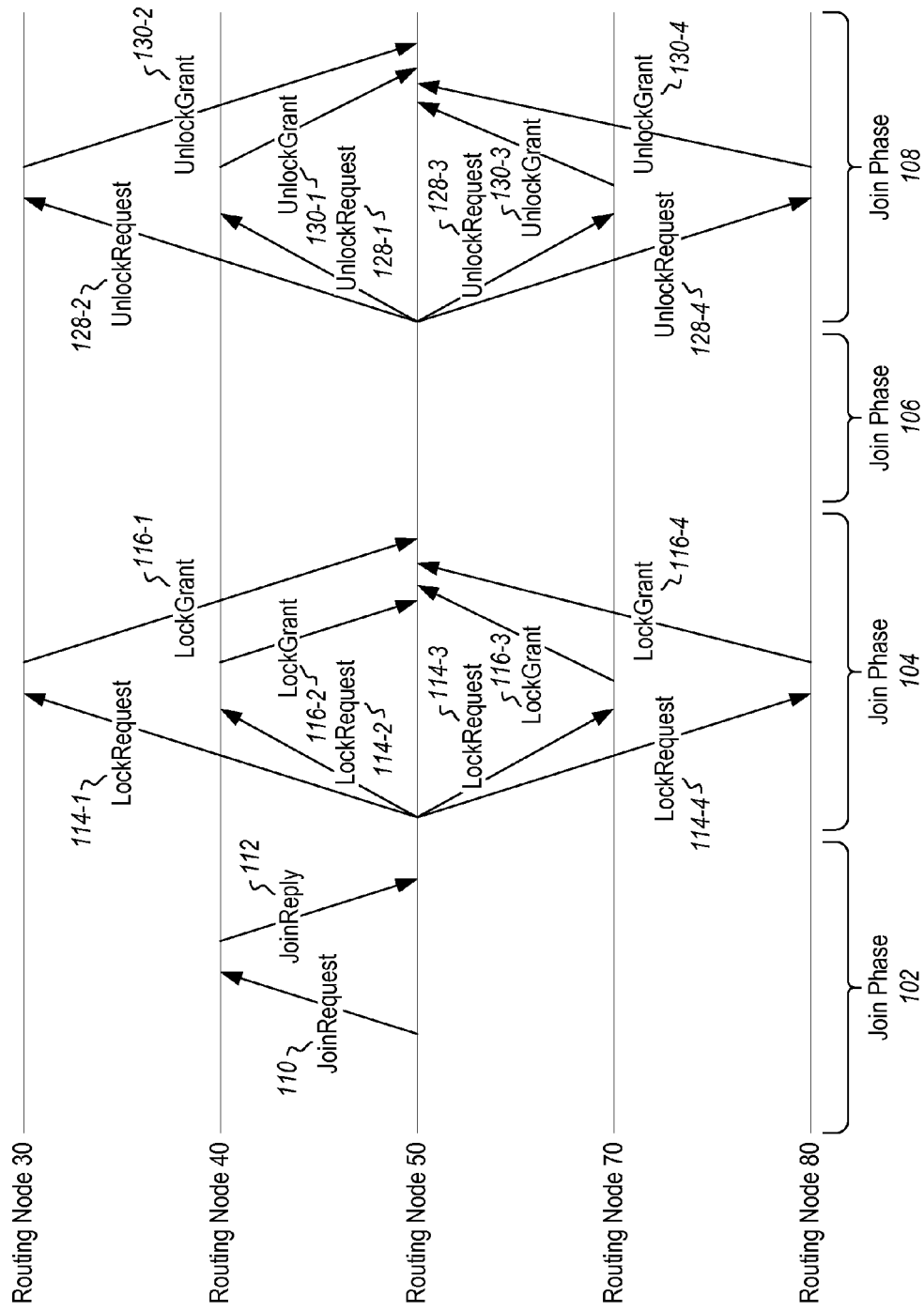
FIG. 3 illustrates an example message exchange.

The following illustrates an example illustrated in conjunction with FIG. 3. Consider an example ring, such as that illustrated in FIG. 1, including nodes 10, 20, 30, 40, 70, 80, and 90. Let the neighborhood size be two nodes on each side, and let nodes 10 and 20 be the entrée nodes, that is, the nodes that nodes joining a ring structure communicate with to join the ring structure. Now suppose that node 50 wishes to join the ring. Below is how the protocol proceeds:

Joining node 50 routes a JoinRequest 110-1 message to its own ID. Node 20 being the closest entrée node is the first hop node. From there, the message is eventually routed to node 40, which is closest to the joining node 50.

Node 40 replies back to node 50 with a JoinReply 112-1 message. This message contains the neighborhood of node 40. Once node 50 receives the JoinReply 112-1 message, it knows about nodes 20, 30, 40, 70, and 80. From this, it can deduce its neighborhood to be nodes 30, 40, 70, and 80; and its neighborhood range to be [30, 80].

Node 50 sends LockRequest 114-1, 114-2, 114-3, 114-4 messages to each of its neighboring nodes 30, 40, 70, and 80 respectively. In the simple case when there is no contention in joining the ring, each of these nodes replies back with a LockGrant 116-1, 116-2, 116-3 and 116-4 message respectively.

When node 50 has received all the LockGrant 116-1, 116-2, 116-3 and 116-4 messages and the union of their neighborhood ranges includes the neighborhood range of node 50, it moves onto the Establish Lease Phase 106. Otherwise, it returns back to where node 50 sends LockRequest 114-1, 114-2, 114-3, 114-4 messages to each of its neighboring nodes 30, 40, 70, and 80 respectively..

Node 50 establishes a lease with each of its neighbors. Once the lease establishment is successful, it moves on to the Unlock Phase.

Node 50 sends an UnlockRequest 128-1, 128-2, 128-3, and 128-4 message to each of its neighboring nodes and waits for an UnlockGrant 130-1, 130-2, 130-3, and 130-4 message from each of these nodes. It then completes the Join Protocol.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
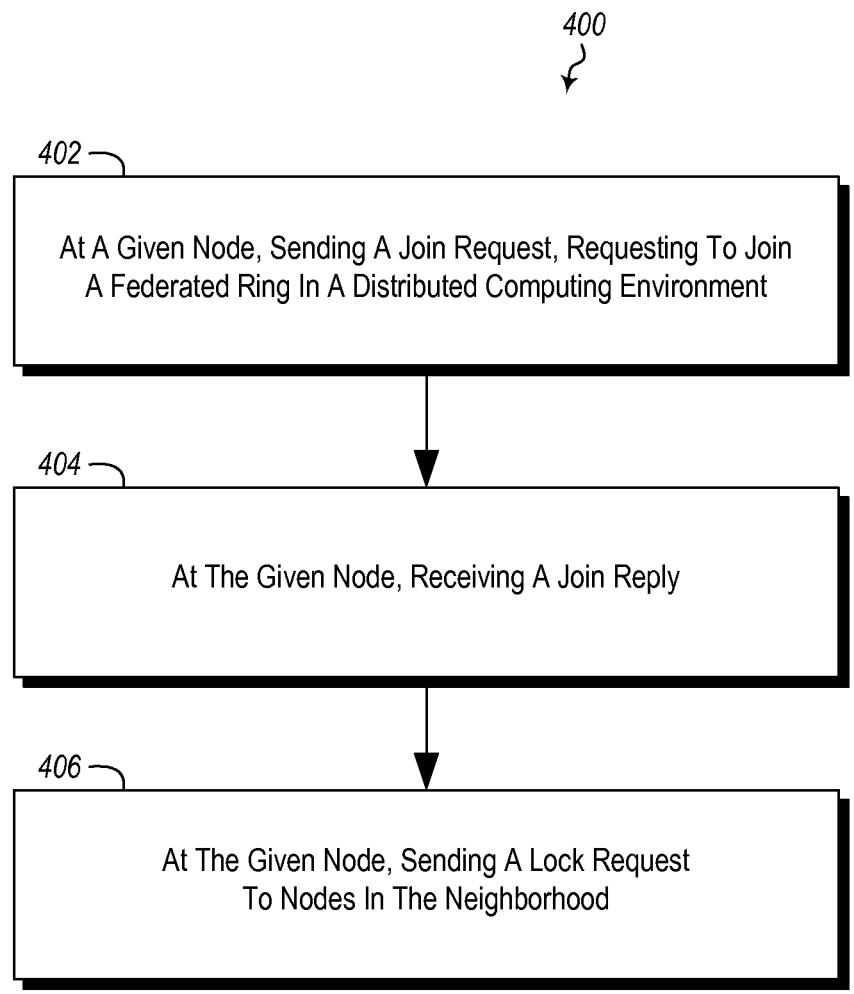
FIG. 4 illustrates a method of obtaining knowledge about nodes in a federated ring.

Referring now to FIG. 4, a method 400 is illustrated. The method 400 may be practiced in a distributed computing environment comprising a plurality of nodes in a federated ring. The method includes acts for obtaining tight knowledge about nodes in the computing environment. The tight knowledge includes information about neighbors of a given node. The method includes at a given node, sending a join request, requesting to join a federated ring in a distributed computing environment (act 402). For example, a node may wish to join the node ring structure 100 (FIG. 1) an as a result may send a join request 110 (FIG. 3).

The method 400 further includes, at the given node receiving a join reply (act 404). The join reply provides an initial view of at least a portion of a neighborhood of the given node. The neighborhood is a set of nodes logically proximate the given node. For example as illustrated in FIG. 3, a join reply 112 is received by joining node 50 from routing node 40. Routing node 40 provides an initial view of joining node 50's neighborhood by providing a view of its own neighborhood.

The method 400 further includes at the given node, sending a lock request to nodes in the neighborhood to request that the other nodes in the given node's neighborhood are locked so as to not have overlapping nodes joining the given node's neighborhood simultaneously. For example, FIG. 3 illustrates the joining node 50 sends lock requests to various nodes including nodes 30, 40, 70 and 80.

The method 400 may be practiced where the join request is addressed to the given node and sent to a node that the given node knows about already in the ring. For example, in the example illustrated in FIG. 3, the joining node 50 may actually address the join request 110 to itself and send it to an entrée node. Routing to the jointing node 50 will cause the request 110 to end up at the routing node 40, after which the routing node 40 sends the join reply 112 to the joining node 50.

The method 400 may further include receiving lock grants from all of the nodes in the given node's neighborhood. This provides an indication that all of the other nodes in the given node's neighborhood are not currently allowing other nodes to join the given node's neighborhood. For example, FIG. 3 illustrates lock grants 116-1 through 116-4 being received by the joining node 50 from nodes (30, 40, 70, and 80) in node 50's neighborhood.

The method 400 may further include at the given node, establishing a lease with each of the nodes in the given node's neighborhood so as to provide functionality for indicating if any of the nodes in the given node's neighborhood go down. After the lease has been established, the method 400 may further include at the given node sending an unlock request to each of the nodes in the given node's neighborhood to release any locks created as a result of the lock request and receiving an unlock grant from each of the nodes in the given node's neighborhood. FIG. 3 illustrates unlock requests 128-1 through 128-4 and unlock grants 130-1 through 130-4.

In some examples, neighborhood nodes may deny lock requests. Thus, the method 400 may further include receiving one or more lock denies from one or more of the nodes in the given node's neighborhood indicating that one or more of the other nodes in the given node's neighborhood are currently locked by some other joining node. In particular, nodes in given node's neighborhood may have already granted locks to other joining nodes that have not yet completed the join process. In some such embodiments, the given node may periodically resend lock request messages to nodes in the given node's neighborhood that the given node does not have a lock on, until a lock is obtained, or until a timeout or other failure condition occurs where after the given node ceases to resent lock requests.

Alternatively, the method 400 may include receiving one or more lock denies from one or more of the nodes in the given node's neighborhood indicating that one or more of the other nodes in the given node's neighborhood are currently locked by some other joining node and as a result sending a lock transfer request to the other joining node to attempt to have the other joining node's locks transferred to the given node. Thus, if different nodes are attempting to join the federated ring, and the joining nodes have overlapping neighborhoods, the nodes may send each other a lock transfer request. One node can transfer its locks to the other node, allowing the other node to join the federated ring, while the other node may have to wait to join the federated ring. In some embodiments, joining nodes transfer their locks based on logical rules. For example, logical rules may evaluate nodes to determine which node holds the most locks and the node with the least locks transfers its locks to the node with the most locks. Alternatively or additionally, the logical rules may evaluate nodes to determine which node has a smaller node ID, or which node has a larger node ID. Either smaller ID nodes are larger ID nodes may be selected to transfer their locks to the other node.

Embodiments may further include sending one or more lock renew messages to address any potential timeouts of locks of nodes in the given node's neighborhood. In particular, locks may have a timeout applied so as to prevent system failure when individual nodes go down. For example, if a joining node were to go down after obtaining one or more locks, portions of the federated ring would be blocked from adding new nodes. By implementing a timeout period, this can be prevented. However, to deal with the timeout period, nodes may be configured to renew locks until the nodes have completed the join protocol.

Embodiments of the method 400 may be practiced where logical proximity for determining whether or not a node is in the neighborhood is based on node identifier numbers. For example, when a node joins a federated ring, it may be given a node identifier. The node identifiers may be ordered in a circular fashion. For example, as illustrated above, node 10 follows node 90. Logical proximity for routing and for determining neighborhood membership may be determined based on node identifier numbers.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment comprising a plurality of nodes in a federated ring, a method of obtaining tight knowledge about nodes in the computing environment, the tight knowledge comprising information about neighbors of a given node, the method comprising:
    a given node sending a join request, requesting that the given node join an existing federated ring in a distributed computing environment;
    the given node receiving a join reply from a replying node already in the federated ring, the join reply including a full list of all nodes in the federated ring in a neighborhood of the replying node and providing an initial view of at least a portion of a neighborhood of the given node, the neighborhood of the given node being a set of nodes logically proximate the given node; and
    the given node sending a lock request to nodes in the neighborhood to request that the other nodes in the given node's neighborhood be locked, preventing overlapping nodes simultaneously joining the given node's neighborhood;
    receiving lock grants from all of the nodes in the given node's neighborhood indicating that all of the other nodes in the given node's neighborhood are not currently allowing other nodes to join the given node's neighborhood;
    the given node establishing a lease with each of the nodes in the given node's neighborhood, providing functionality indicating if any of the nodes in the given node's neighborhood go down;
    at the given node sending an unlock request to each of the nodes in the given node's neighborhood to release any locks created as a result of the lock request; and
    receiving an unlock grant from each of the nodes in the given node's neighborhood.

2. The method of claim 1, wherein the join request is addressed to the given node, itself, and is sent to a node already in the ring that the given node knows about.

3. The method of claim 1, further comprising:
    receiving one or more lock denies from one or more of the nodes in the given node's neighborhood indicating that one or more of the other nodes in the given node's neighborhood are currently locked by some other joining node; and
    as a result of receiving the one or more lock denies, periodically resending lock request messages to nodes in the given node's neighborhood that the given node does not have a lock on, until a lock is obtained.

4. The method of claim 1, further comprising:
    receiving one or more lock denies from one or more of the nodes in the given node's neighborhood indicating that one or more of the other nodes in the given node's neighborhood are currently locked by some other joining node; and
    as a result of receiving the one or more lock denies, sending a lock transfer request to the other joining node to request the other joining node's locks be transferred to the given node.

5. The method of claim 4, wherein the other joining node transfers its locks based on logical rules.

6. The method of claim 5 wherein the logical rules evaluate nodes to determine which node holds the most locks.

7. The method of claim 5 wherein the logical rules evaluate nodes to determine which node has a smaller node ID.

8. The method of claim 5 wherein the logical rules evaluate nodes to determine which node has a larger node ID.

9. The method of claim 1, further comprising avoiding timeouts of locks of nodes in the given node's neighborhood by sending one or more lock renew messages.

10. The method of claim 1, wherein logical proximity for determining whether or not a node is in the neighborhood is based on node identifier numbers.

11. In a distributed computing environment comprising a plurality of nodes in a federated ring, a system for obtaining tight knowledge about nodes in the computing environment, the tight knowledge comprising information about neighbors of a given node, the system comprising:
    one or more processors; and
    one or more computer readable storage devices having encoded thereon computer executable instructions that when executed by at least one of the one or more processors cause at least one of the one or more processors to perform the following:
        a given node sending a join request, the join request requesting that the given node join an existing federated ring in a distributed computing environment;
        the given node receiving a join reply from a replying node already in the federated ring, the join reply including a full list of all nodes in the federated ring in a neighborhood of the replying node and providing an initial view of at least a portion of a neighborhood of the given node, the neighborhood of the given node being a set of nodes logically proximate the given node; and
        the given node sending a lock request to nodes in the neighborhood to request that the other nodes in the given node's neighborhood be locked, preventing overlapping nodes simultaneously joining the given node's neighborhood;
        receiving lock grants from all of the nodes in the given node's neighborhood indicating that all of the other nodes in the given node's neighborhood are not currently allowing other nodes to join the given node's neighborhood;

the given node establishing a lease with each of the nodes in the given node's neighborhood, providing functionality indicating if any of the nodes in the given node's neighborhood go down;

at the given node sending an unlock request to each of the nodes in the given node's neighborhood to release any locks created as a result of the lock request; and receiving an unlock grant from each of the nodes in the given node's neighborhood.

12. The system of claim 11, wherein the join request is addressed to the given node and sent to a node that the given node knows about already in the ring.

13. The system of claim 11, further comprising:

receiving one or more lock denies from one or more of the nodes in the given node's neighborhood indicating that one or more of the other nodes in the given node's neighborhood are currently locked by some other joining node; and as a result of receiving one or more lock denies, periodically resending lock request messages to nodes in the given node's neighborhood that the given node does not have a lock on, until a lock is obtained.

14. The system of claim 11, further comprising:

receiving one or more lock denies from one or more of the nodes in the given node's neighborhood indicating that one or more of the other nodes in the given node's neighborhood are currently locked by some other joining node; and as a result of receiving one or more lock denies, requesting to have the other joining node's locks transferred to the given node by sending a lock transfer request to the other joining node.

15. The system of claim 11, further comprising sending one or more lock renew messages to prevent potential timeouts of locks of nodes in the given node's neighborhood.

16. The system of claim 11, wherein logical proximity for determining whether or not a node is in the neighborhood is based on node identifier numbers.

17. A computer program product comprising a computer readable device, wherein the computer readable device comprises computer executable instructions that when executed by at least one or more processors cause at least one of the one or more processors to perform the following:

at a given node, sending a join request, requesting that the given node join a federated ring in a distributed computing environment;

at the given node, receiving a join reply, the join reply providing an initial view of at least a portion of a neighborhood of the given node, the neighborhood being a set of nodes logically proximate the given node;

at the given node, sending a lock request to nodes in the neighborhood requesting that other nodes in the given node's neighborhood comprising all nodes in the given node's neighborhood except the given node be locked, preventing overlapping nodes joining the given node's neighborhood simultaneously;

receiving one or more lock denies from one or more of the nodes in the given node's neighborhood indicating that one or more of the other nodes in the given node's neighborhood are currently locked by some other joining node; and as a result of receiving one or more lock denies, periodically resending lock request messages to nodes in the given node's neighborhood that the given node does not have a lock on, until a lock is obtained;

receiving lock grants from all of the nodes in the given node's neighborhood indicating that all of the other nodes in the given node's neighborhood are not currently allowing other nodes to join the given node's neighborhood;

at the given node, establishing a lease with each of the nodes in the given node's neighborhood, providing functionality indicating if any of the nodes in the given node's neighborhood go down;

at the given node sending an unlock request to each of the nodes in the given node's neighborhood to release any locks created as a result of the lock request; and receiving an unlock grant from each of the nodes in the given node's neighborhood.

18. The computer program product of claim 17, further comprising, avoiding timeouts of locks of nodes in the given node's neighborhood by sending one or more lock renew messages.

* * * * *